United States Patent [19]

Aoki et al.

[11] 4,422,698

[45] Dec. 27, 1983

[54] BEARING ASSEMBLY

[75] Inventors: Akio Aoki; Kenichi Uchida, both of Fujisawa, Japan

[73] Assignee: Nippon Seiko Kabushiki Kaisha, Tokyo, Japan

[21] Appl. No.: 204,546

[22] Filed: Nov. 6, 1980

Related U.S. Application Data

[63] Continuation of Ser. No. 976,643, Dec. 20, 1978, abandoned.

[30] Foreign Application Priority Data

Dec. 24, 1977 [JP] Japan .................................. 52-155993
Aug. 2, 1978 [JP] Japan .................................. 53-93663

[51] Int. Cl.³ .......................... F16C 1/24; F16C 33/78
[52] U.S. Cl. ................................................. 308/187.1

[58] Field of Search ................. 29/148.4 A; 308/36.1, 308/187, 187.1, 187.2, 207 R, 211, 194

[56] References Cited

U.S. PATENT DOCUMENTS 3,502,375 3/1970 Whittum .......................... 308/187.2
3,512,853 5/1970 Petros ........................... 308/187.1 X Primary Examiner—Charles E. Phillips
Attorney, Agent, or Firm—Shapiro and Shapiro

[57] ABSTRACT

A bearing assembly includes a fixed member, a rotatable member and a bearing for supporting rotatably the rotatable member to the fixed member. The bearing is sealed by a seal. At the axially outside of the seal is formed an annular chamber surrounded by the fixing member, the rotatable member and the bearing. A discharge hole communicating with the chamber is formed in the fixed member.

11 Claims, 3 Drawing Figures

BEARING ASSEMBLY

This is a continuation application of Ser. No. 971,643, filed Dec. 20, 1978, now abandoned.

BACKGROUND OF THE INVENTION

1. Field of the Invention

This invention relates to a bearing assembly. Particularly, it relates to a seal device for a bearing assembly suited for journalling the rolls of a rolling mill or the like.

2. Description of the Prior Art

Various seal devices for bearings have heretofore been developed. For example, the seal device for the bearings mounted on the roll neck of a rolling mill which uses a great quantity of water for cooling the roll and journalling and carrying the roll has been variously contrived (see, for example, Japanese Utility Model Publication No. 21368/1969). However, these known devices are complicated in construction, and they have required a number of special steps for the manufacture of parts, and tended toward increased sizes of the devices.

Also, these known devices can not discharge inadvertently incoming water and dust therefrom to prevent such foreign materials from entering into the bearing mechanism.

In the bearing industry, a great variety of bearings having high accuracy are required and the manufacturer of bearings must accurately meet such wide range of demand. In this context, the construction of bearings must be as simple as possible and of low cost of manufacture as well as of high reliability. Thus, the simplification of the construction of the seal device and enhanced function thereof must be achieved. The present invention chiefly overcomes such problems.

SUMMARY OF THE INVENTION

It is an object of the present invention to provide a bearing assembly having an excellent sealing function.

It is another object of the present invention to provide a bearing assembly having a structurally simple seal device.

It is still another object of the present invention to provide a bearing assembly having a seal device which can reduce the consumption of bearing lubricant.

It is yet still another object of the present invention to provide a bearing assembly having excellent reliability and a long service life.

Other objects, construction and effect of the present invention will become apparent from the following detailed description of preferred embodiments of the invention taken in conjunction with the accompanying drawings.

DESCRIPTION OF THE PREFERRED EMBODIMENT

Figure 1:
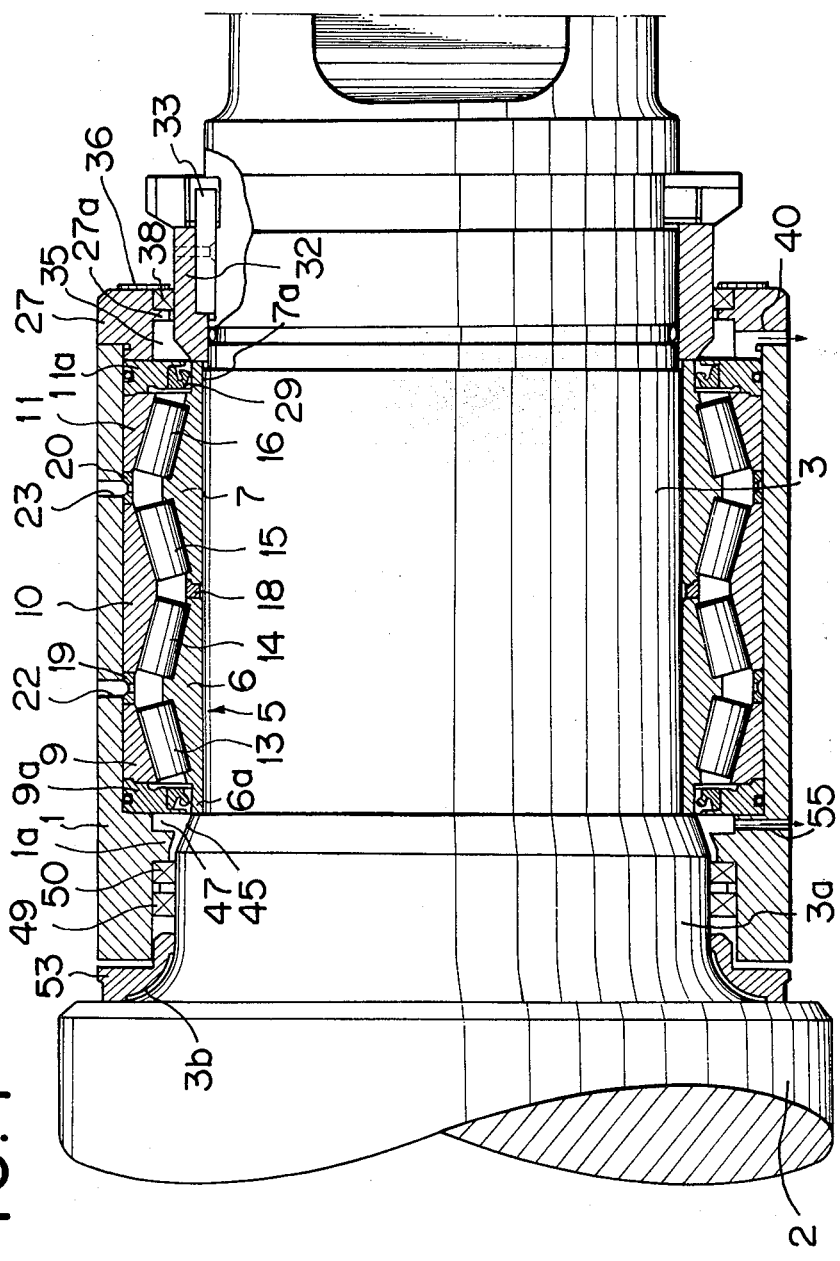
FIG. 1 is an axial cross-sectional view of a first embodiment of the present invention.

The embodiments shown in the drawings illustrate an application of the invention to a bearing assembly for supporting the roll of a rolling mill.

FIG. 1 is an axial cross-sectional view of essential portions of a first embodiment of the present invention. Reference character 1 denotes a bearing housing which is a fixed member of a rolling mill body. The housing is called a chock. Within the chock 1, the shaft of a rolling roll 2, namely, a roll neck 3 is journalled by means of four rows of conical roller bearings 5 in the case of the present embodiment. The bearings 5 are not restricted to the four rows of conical roller bearings, but may be two rows of conical roller bearings or any of other type roller bearings such as cylindrical roller bearings and spherical roller bearings. The bearings 5 include two inner race elements 6 and 7 which form the inner race, three outer race elements 9, 10 and 11 which form the outer race, and four rows of rollers 13, 14, 15 and 16 disposed between the inner and the outer race. The two race elements 6 and 7 are juxtaposed axially and an interseat member 18 which is a spacer is interposed between the two race elements. Where the engagement of the inner race with the roll neck 3, for example, is relatively loose to facilitate replacement of the rolling roll, there is a danger of cooling water for cooling the roll or rolling oil and foreign materials contained in the water or the oil entering into the bearings via the clearance between the roll neck and the inner race from the clearance between the interseat member 18 and the end face of the inner race opposed thereto to thereby expedite the deterioration of the lubricant in the bearings, for example, grease. To prevent this, a seal member (not shown) may be secured to the portion of the interseat member 18. The outer race elements 9, 10 and 11 are also juxtaposed axially and interseat members 19 and 20 which are spacers are interposed between the outer race elements. The interseat members 19 and 20 for the outer race have holes formed at suitable circumferential locations thereof and on the other hand, holes 22 and 23 corresponding to one of the holes in the interseat members 19 and 20 are formed radially in the chock 1 so as to enable the bearing lubricant to be poured suitably therethrough. Unshown stoppers are inserted into the holes 22 and 23 in the chock except when the lubricant is poured.

Such stoppers may be provided because the bearings can be used for a considerably long time without replenishment of the lubricant if cooling water or rolling oil or other harmful foreign material does not enter into the bearings.

Therefore, when the check-up is effected by removing the bearings from the chock before the lubricant is supplied, the previously described holes in the interseat members and the corresponding holes 22 and 23 in the chock become unnecessary.

The inner race element 7 has a rightwardly extending extension 7a and on the outer race side opposed to the extension 7a, a seal holding member 11a integral with or integrally coupled to the outer race element 11 is urged against the outer race element 11 into an integral relationship therewith by an outer race holding member 27 forming a fixed member integrally with the chock. An oil seal 29 as a seal element is fitted to and held by the inner peripheral surface of the seal holding member 11a and the seal lip thereof adjacent to the inner periphery frictionally contacts the extension 7a of the inner race. The seal holding member 11a and the oil seal 29 together constitute a first right-hand sealing means for the bearings 5. The construction of the sealing means is not restricted to that shown, but may be of any other construction.

An inner race holding member 32 is disposed on the radially inner side of the outer race holding member 27 in spaced apart relationship therewith. The inner race holding member 32 has its left end face abutting with the end face of the extension 7a of the inner race element 7 and is prevented from rotating relative to the roll neck 3 by a key 33. The outer race holding member 27 has an inwardly directed annular protrusion 27a adjacent to the outer peripheral portion of the inner race holding member 32, and the inner peripheral surface of the outer race holding member 27, the outer peripheral surface of the inner race holding member 32, the seal holding member 11a and the right end face portion of the oil seal 29 together constitute an annular chamber 35. A plate member 36 is secured to the right end face portion of the outer race holding member 27, and a second sealing means such as oil seal 38 or the like is provided in the portion defined by the plate member 36, the right end inner peripheral surface of the outer race holding member, the inwardly directed annular protrusion 27a and the outer peripheral surface of the inner race holding member. In the lower portion of the outer race holding member 27, a discharge hole 40 communicating with the aforementioned annular chamber 35 is formed to permit discharge of cooling water coming from the second sealing means 38. The position, shape and number of this discharge hole 40 may be suitable selected as required.

On the other hand, a left-hand first sealing means 45 for the bearings 5 is provided between the leftwardly directed extension 6a of the left-hand inner race element 6 forming the bearings 5 and a seal holding member 9a provided integrally with the outer race element 9 and shaped symmetrically with the aforementioned seal holding member 11a. In the present embodiment, the construction of the left-hand first sealing means is similar to that of the right-hand first sealing means and need not be described in detail. In the present embodiment, the left-hand and the right-hand first sealing means are of the same construction but these may be of different constructions.

The chock 1 has a radially inwardly directed annular protrusion 1a extending adjacent to the enlarged diameter portion 3a of the roll neck 3, and an annular chamber 47 is defined by the annular protrusion 1a, the adjacent inner peripheral surface of the chock 1, the outer peripheral surface of the roll neck and the left end face of the bearings 5. Seals 49 and 50 are provided between the left end inner peripheral surface of the chock 1 and the outer peripheral surface of the enlarged diameter portion 3a of the roll neck. In the root portion 3b of the roll neck 3, a fillet ring 53 is disposed in opposed relationship with the leftmost end portion of the chock 1. The fillet ring 53 and the seals 49, 50 together constitute a left-hand second sealing means for the bearings 5. In the lower portion of the chock 1, a discharge hole 55 communicating with the annular chamber 47 is formed to permit discharge of cooling water and rolling oil coming through the left-hand second sealing means. The position, shape and number of the hole 55 may also be suitably selected. With such a construction, the cooling water coming toward the bearings 5 via the right-hand and the left-hand second sealing means is discharged from chambers 35 and 47 through the discharge holes 40 and 55, (access of water to the chambers being restricted, as shown) so that the amount of cooling water or the like coming into the bearings 5 through the right-hand and the left-hand first sealing means is greatly reduced and this leads to conspicuous avoidance of damage imparted to the bearings and early deterioration of the lubricant, as compared with the conventional device.

Particularly, in the above-described embodiment, the second sealing means is provided by an oil seal to enhance the sealing function, whereas a labyrinth type sealing mechanism may be employed depending on the condition of use and the second sealing means may sometimes be omitted.

Although not disclosed in the shown embodiment, a vacuum mechanism connected to the discharge hole may be installed as the means for positively discharging the incoming cooling water and rolling oil.

Figure 2:
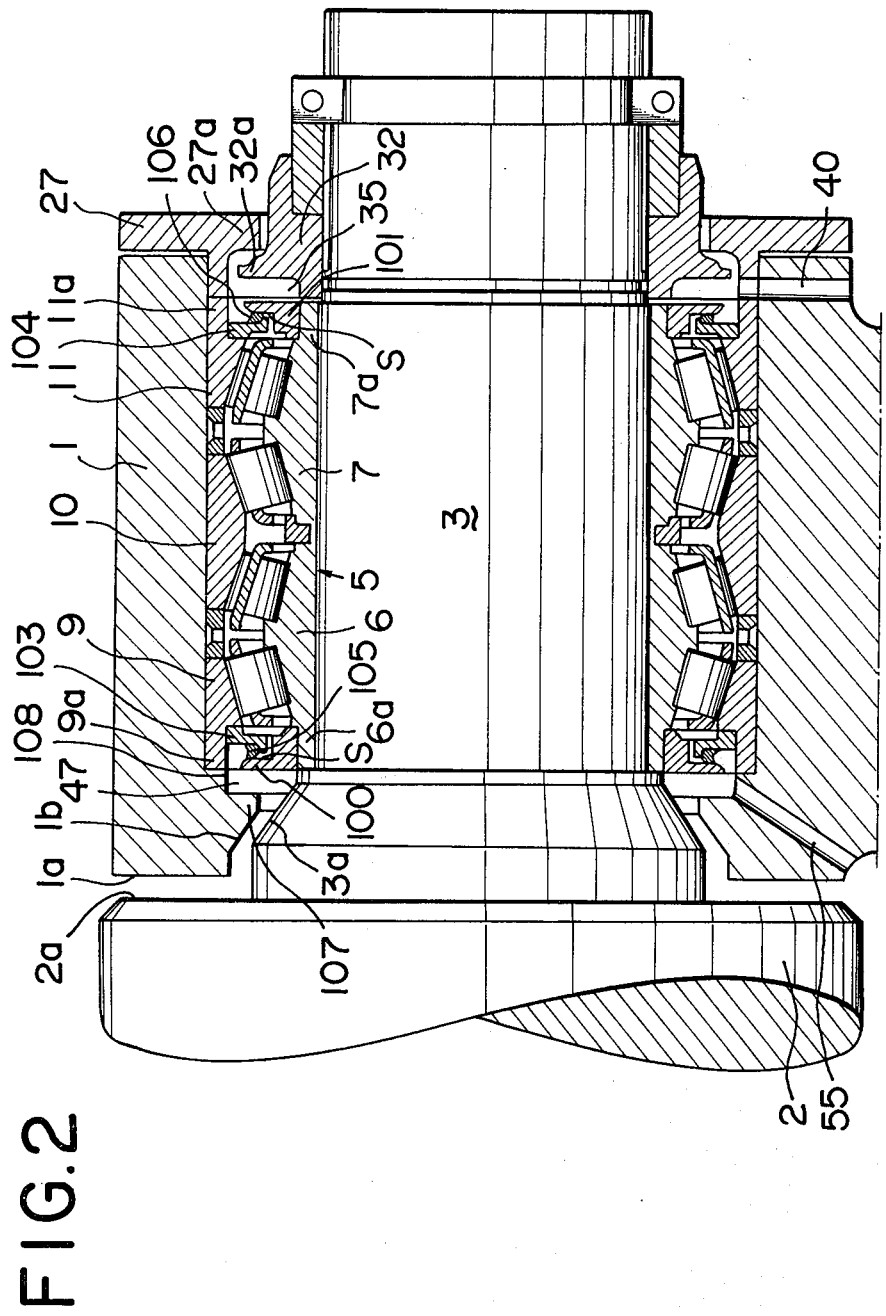
FIG. 2 is an axial cross-sectional view of a second embodiment of the present invention.

Reference is now had to FIG. 2 to describe a second embodiment of the present invention.

The parts of the second embodiment identical to those of the first embodiment are given identical reference characters and the parts structurally identical to those of the first embodiment need not be described and only the parts differing from those of the first embodiment will be described hereinafter.

The inner race elements 6, 7 and the outer race elements 9, 11 at the axially opposite ends of the bearings 5 have extensions 6a, 7a and 9a, 11a projected axially outwardly. On the outer periphery of the extensions 6a and 7a of the inner race elements 6 and 7, there are securely fitted slingers 100 and 101 having a surface S extending diametrically outwardly of the bearings and substantially opposed to the side surface of the bearings 5. Also, in the extensions 9a and 11a of the outer race elements 9 and 11, there are fixed seal plates 103 and 104 extending diametrically inwardly of the bearings and having the end portions thereof bent in L-shape and opposed to the slingers 100 and 101. Seal bodies 105 and 106 formed of an elastic material are securely held to the L-shaped bend portions of the seal plates 103 and 104 and are set so that the lips of the seal bodies frictionally contact the inner side surfaces of the slingers 100 and 101.

An outer race holding member 27 is secured to the right end of the chock 1. The outer race holding member 27 has a radially inwardly directed annular protrusion 27a and the inner peripheral surface of the annular protrusion 27a extends to the vicinity of the outer peripheral portion of the inner race holding member 32. The inner race holding member 32 is fitted against rotation relative to the roll neck 3 and has on the outer periphery thereof a flange 32a extending diametrically outwardly of the bearings and located slightly axially inwardly of the inwardly directed protrusion 27a of the outer race holding member. The flange 32a functions as a slinger member. Thus, an annular chamber 35 is formed between the right end face of the bearings and the inner race and outer race holding members 32 and 27, and a discharge hole 40 communicating with the annular chamber 35 is formed in the lower portion of the outer race holding member 27 and chock 1.

The end portion of the chock adjacent to the roll has an end face 1a facing the end face 2a of the roll 2 and in the axially extending inner periphery of the chock, there is a rib 107 having a conically sloped surface 1b facing the enlarged diameter portion of the roll neck and projected diametrically inwardly. The inner side of the rib is formed into a diametrically sharp surface. The chock 1 forms a stepped portion 108 slightly inwardly therefrom, and the surface of this stepped portion abuts with the outer bearing race element 9 to determine the axial position of the outer race.

Thus, in the end portion of the chock 1 adjacent to the roll, an annular chamber 47 surrounded by the left end face of the bearings, the inner peripheral surface of the chock 1, the inner surface of the rib 107 and the outer peripheral surface of the roll neck is also formed. A discharge hole 55 communicating with the annular chamber 47 is formed in the lower portion of the chock 1.

Figure 3:
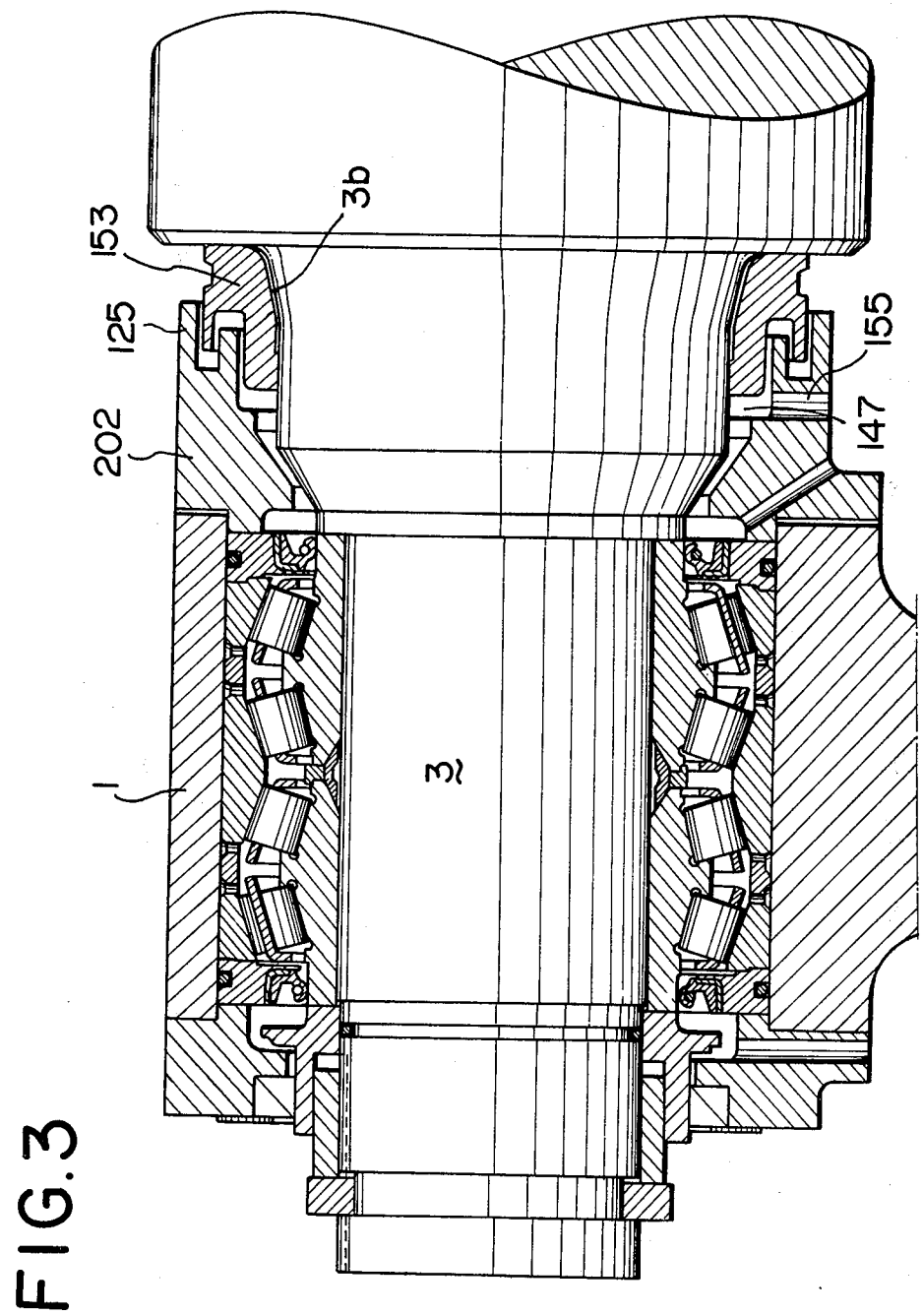
FIG. 3 is an axial cross-sectional view of a third embodiment of the present invention.

A third embodiment of the invention is shown in FIG. 3. However, only portions which are different from the first or second embodiment will be described below.

In case of the third embodiment a fillet ring 153 secured to the root portion 3b of the roll neck 3. A separate outer race holding member 202 is provided with relation to the chock 1. The outer race holding member 202 has a dual annular projection 125 extending axially and a sleeve-like axial projection 153a is received therein to form a kind of labyrinth seal. In the third embodiment a further discharge hole 155 is formed through the lower portion of the race holding member 202 to communicate with a further annular chamber or clearance 147 surrounded by the roll neck 3, the outer race holding member 202 and the fillet ring 153.

According to the present invention, the cooling water, oil and the like which tend to come into the bearings along the rotary member and the fixing member supporting it by means of the bearings can be efficiently discharged outwardly, thus greatly reducing the opportunity of the bearings being dipped in the cooling water or the like and accordingly, greatly reducing the consumption of the bearing lubricant and increasing the service life of the bearings themselves.

What we claim is:

1. In rolling mill apparatus of the type having a bearing assembly supporting a rotatable roll neck of a mill roll for rotation about an axis on a fixed chock, the bearing assembly including an outer race, an inner race, and rolling elements therebetween, and the bearing assembly including seal means between the inner and outer races for sealing the rolling elements in a region between the inner and outer races, the improvement comprising chamber means disposed adjacent to and axially outward of said seal means, means for restricting entry of contaminants to said chamber means from the exterior of said assembly, and discharge means positioned axially outward of said seal means for discharging from said chamber means contaminants which enter said chamber means through said restricting means, said discharge means comprising a discharge opening formed through said chock for draining contaminants from said chamber means along a path separated from the entry of said contaminants into said chamber means.

2. The improvement in accordance with claim 1, wherein the outer race has means coupled thereto for holding the seal means.

3. The improvement in accordance with claim 1, wherein the seal means comprises a pair of seals positioned at opposite axial ends of the bearing assembly, and the chamber means comprises a pair of chambers adjacent to and axially outward of said seals, respectively.

4. The improvement in accordance with claim 1, wherein said rolling elements are provided with a lubricant that is adversely affected by said contaminants.

5. The improvement in accordance with claim 1, wherein said rolling elements are roller bearings.

6. The improvement in accordance with claim 1, wherein said rolling elements are conical roller bearings.

7. The improvement in accordance with claim 1, wherein said rolling elements are four-row conical roller bearings.

8. In a rolling mill apparatus of the type having a bearing assembly supporting a rotatable roll neck of a mill roll for rotation about an axis on a fixed chock, the bearing assembly including a first annular element fixed to the chock, a second annular element separated radially from the first annular element and supporting the roll neck, rolling elements disposed between the first and second annular elements, and seal means for sealing the bearing assembly at opposite axial ends thereof, the improvement comprising:

a pair of chamber forming means disposed adjacent to and axially outward of said seal means at opposite axial ends of the bearing assembly, respectively, the pair of chamber forming means and said seal means forming a pair of chambers partly defined by the seal means;

a pair of restricting means provided to restrict entry of contaminants to said chambers from the exterior of said assembly; and a pair of discharge means for discharging from said chambers contaminants which enter said chambers through said restricting means, each of said discharge means comprising a discharge opening formed through said chock for draining contaminants from one of said chambers along a path separated from the entry of said contaminants into said chambers.

9. Rolling mill apparatus according to claim 8, wherein said seal means includes a pair of third annular elements secured to said first annular element at opposite axial ends thereof, a pair of fourth annular elements extended from the axial ends of said second annular element to oppose radially to said third annular elements, and a pair of seal elements supported by the internal surfaces of said third annular elements and disposed between the third and fourth annular elements.

10. Rolling mill apparatus according to claim 9, wherein said restricting means includes a further pair of seal elements axially outward of said chambers, respectively.

11. In an apparatus of the type having a bearing assembly supporting a rotatable member for rotation about an axis on a fixed member, the bearing assembly including a first annular element fixed to the fixed member, a second annular element separated radially from the first annular element and supporting the rotatable member, rolling elements disposed between the first and second annular elements, and seal means for sealing the bearing assembly at opposite axial ends thereof, the improvement comprising:

a pair of chamber forming means disposed adjacent to and axially outward of said seal means at opposite axial end of the bearing assembly, respectively, the pair of chamber forming means and said seal means forming a pair of chambers partly defined by the seal means;

a pair of restricting means provided to restrict entry of contaminants to said chambers from the exterior of said assembly; and a pair of discharge means for discharging from said chambers contaminants which enter said chambers through said restricting means, each of said discharge means comprising a discharge opening formed through said fixed member for draining contaminants from one of said chambers along a path separated from the entry of said contaminants into said chambers.

* * * * *

UNITED STATES PATENT AND TRADEMARK OFFICE
CERTIFICATE OF CORRECTION

PATENT NO. : 4,422,698
DATED : December 27, 1983
INVENTOR(S) : Akio AOKI; Kenichi UCHIDA It is certified that error appears in the above-identified patent and that said Letters Patent are hereby corrected as shown below:

On the cover page of the patent, item [63], Serial No. "976,643" should be -- 971,643 --.

Signed and Sealed this

Twenty-ninth Day of May 1984

[SEAL]

Attest:

GERALD J. MOSSINGHOFF

Attesting Officer

Commissioner of Patents and Trademarks